United States Patent [19]

Agar

[11] 4,313,829
[45] Feb. 2, 1982

[54] APPARATUS FOR SEPARATING THE COMPONENTS OF A NON-NEWTONIAN FLUID

[75] Inventor: Joram Agar, Grand Cayman, British West Indies

[73] Assignee: Agar Corporation N.V., Netherlands Antilles

[21] Appl. No.: 125,075

[22] Filed: Feb. 27, 1980

[30] Foreign Application Priority Data

Feb. 1, 1980 [GB] United Kingdom ............... 03552/80

[51] Int. Cl.³ .......................... C02F 1/40; E02B 15/04
[52] U.S. Cl. ................................ 210/242.3; 210/540; 210/923
[58] Field of Search ............... 210/748, 776, 799, 800, 210/922, 923, 242 R, 242 AS, 242 S, 540

[56] References Cited

U.S. PATENT DOCUMENTS

| | | | |
|---|---|---|---|
| 2,163,649 | 6/1939 | Weaver | 210/748 X |
| 2,766,881 | 10/1956 | Westervelt et al. | 210/748 X |
| 3,432,426 | 3/1969 | Megel | 210/748 X |
| 3,659,713 | 5/1972 | Mueller | 210/242 S X |
| 3,700,108 | 10/1972 | Richards | 210/242 S |
| 3,789,586 | 2/1974 | Arnold et al. | 210/923 X |
| 3,847,815 | 11/1974 | Chastan-Bagnis | 210/778 X |
| 4,059,526 | 11/1977 | Middelbeek | 210/923 X |
| 4,111,811 | 9/1978 | Fukuda et al. | 210/923 X |
| 4,128,068 | 12/1978 | Ogura et al. | 210/242 S X |
| 4,136,030 | 1/1979 | Seike et al. | 210/923 X |

Primary Examiner—Robert H. Spitzer
Attorney, Agent, or Firm—Beveridge, DeGrandi, Kline & Lunsford

[57] ABSTRACT

A method of separating the components of a non-Newtonian fluid. Movement of the fluid is effected, the non-linearity of the shear stress/shear rate property of at least one component of the fluid is utilized to separate the fluid components, and at least one of the separated components is passed to a point of use through a passage which does not vary as a result of the movement of the fluid.

10 Claims, 15 Drawing Figures

APPARATUS FOR SEPARATING THE COMPONENTS OF A NON-NEWTONIAN FLUID

BACKGROUND OF THE INVENTION

This invention concerns a method for separating the components of a non-Newtonian fluid.

The filtration of small particles in suspension in stationary and flowing fluids is required in many industries. Using conventional techniques of passing the fluid through a fine mesh leads to early clogging of this mesh. Other techniques use centrifugal separation which gives a good non-clogging effect but requires a considerable energy source and a large pressure drop.

An example of current filtration use is in the paper industry, where fresh wood pulp is added to the water after the production of each batch of paper. The water contains special clay, glycol and some sulphur, which makes it rather expensive. Wood pulp, however, contains a lot of dust that has substantially the same density as the water and therefore stays in suspension. The amount of dust increases with each successive use of the water, resulting in the progressive reduction of the quality of the paper produced. Eventually the level of dust becomes so high that the old water cannot be used any more, and a fresh mixture of water-clay-glycol has to be made. The old mixture is left in tanks, and some crude attempts at filtering it are made. Perhaps 30% of the dust is removed, and this enables a re-run of some cheap paper production. In the end, however, the water has to be dumped in the river, to the complaints of the river authorities, and at a high cost to the manufacturer, who then has to purchase fresh water, clay and glycol.

The conventional method of skimming the water in the tank is by blowing air through the tank. The dust collects near the bubbles formed and is scooped from the top of the tank. This method, however, is most inefficient, and also expensive, as it requires large compressors to blow the air through the water.

Clearly, a cheaper, more effective method is required, both from the environmental point of view and for sheer economic reasons.

Similar problems are found in power stations drawing their water from the sea. Mesh filters get clogged very rapidly with seaweed, fish and organic growth. Here again, therefore, an improved filtration method is badly needed.

A further major modern problem to which the present invention is applicable is the recovery of oil from an oil slick. Existing methods are expensive, laborious, and succeed in recovering only some of the oil which has been spilled into the sea.

SUMMARY OF THE INVENTION

According to the present invention, in its broadest aspect, there is provided a method of separating the components of a non-Newtonian fluid comprising effecting movement of the fluid in such a way as to utilise the non-linearity of the shear stress/shear rate property of at least one component of the fluid so as to separate the fluid components, and passing one or more of the separated components to a point of use through a passage which does not vary as a result of the movement of the fluid.

The utilisation of the sheer stress/sheer rate property non-linearity may be effected by causing a flow of the fluid in the form of a continuous or interrupted jet or wave.

The components are preferably separated without altering or controlling the chemical composition or the physical characteristics of the fluid prior to separation.

In one embodiment of the method, the fluid is subjected to a shear stress above the yield point of at least one of the components of the fluid to effect movement of the at least one component, the movement of the at least one component being thereafter slowed down to a speed at which it is separated from another or the other of the components. Thus the fluid may be directed into a container through an inlet aperture thereof, the at least one component being slowed down and collected in the container, and at least one other component thereof passing out through an outlet aperture of the container, the outlet aperture constituting the passage.

The fluid may be directed into the container in the form of a jet, and the jet may be directed along the surface of a quantity of said fluid.

The cross-section of the jet immediately upstream of the inlet aperture is preferably substantially the same as the cross-section of the inlet aperture.

The outlet aperture preferably has a diameter which exceeds that of a nozzle which produces the jet.

The velocity of the jet is preferably just below that which would cause turbulence in the fluid.

In another embodiment of the method of the present invention, the fluid is subjected to an asymmetrical oscillation.

Thus a reciprocable member may be in contact with the fluid, the reciprocable member being reciprocated relatively rapidly in one direction and relatively slowly in the opposite direction so as to effect relative separation of the components of the fluid.

The reciprocable member may be mounted within a container, the frequency of reciprocation of the reciprocable member causing a wave to be reflected from a wall of the container, which wave enhances the separation of the components of the fluid.

In one form of the present invention, there is provided apparatus for separating the components of a non-Newtonian fluid comprising means for subjecting the fluid to an asymmetrical oscillation so as to separate the fluid components, a passage which does not vary as a result of the oscillation, and means for passing one or more of the separated components through the passage to a point of use.

The means for subjecting the fluid to an asymmetrical oscillation may comprise a reciprocable member adapted to be in contact with the fluid, and means for reciprocating the reciprocable member relatively fast in one direction of reciprocation and relatively slowly in the opposite direction thereof.

The means for reciprocating the reciprocable member may comprise a moving coil disposed within a magnet, a plurality of sinusoidal generators of different frequencies, or a plurality of piezo-electric oscillators of different frequencies.

The reciprocable member may be a diaphragm.

The apparatus may comprise a float which carries the reciprocable member.

The passage preferably extends to a space within a container.

The frequency of reciprocation of the reciprocable member may produce a wave which enhances the reciprocation.

The reciprocable member may be disposed adjacent to but spaced from a further member towards and away from which the reciprocable member is in operation reciprocated, reciprocation of the reciprocable member away from the further member drawing the fluid into the space therebetween, and reciprocation of the reciprocable member towards the further member expelling the fluid from the space.

The further member may be a slotted member having at least one slot therein which communicates with at least one collection space, reciprocation of the reciprocable member moving one of the components of the fluid to collection space or spaces.

The or each collection space may be provided with a weir to reduce return flow of a component towards the reciprocable member.

The slotted member is preferably provided with at least one first slot and at least one second slot, the or each first slot communicating with the respective collection space and the or each second slot communicating with a respective reception space for containing the fluid, reciprocation of the reciprocable member moving a component of the fluid from the or each reception space to the or each collection space.

Thus the first and second slots may be relatively large and relatively small slots.

In another embodiment of an apparatus according to the present invention, there is provided apparatus for separating the components of a non-Newtonian fluid comprising a container having an inlet aperture and an outlet aperture, means for opening and closing the inlet and outlet apertures, a conduit having a nozzle positioned to direct a jet of the fluid through the inlet aperture, means permitting variation of the distance of the nozzle from the inlet aperture, means permitting variation of the position of the nozzle with respect to the level of the fluid, and means for pumping fluid from the quantity of fluid through the conduit so as to issue through the nozzle as a jet, the arrangement being such that at least one of the components of the fluid entering the container is, in operation, slowed down and retained therein while at least one other component passes out through the outlet aperture.

The cross-sectional area of the outlet aperture is preferably greater than that of the nozzle. Moreover, the inlet and outlet apertures are preferably disposed adjacent to one another.

The container is preferably adapted to float in the fluid and may be provided with at least one bouyancy member.

The container may be provided with a rudder.

The conduit may have an inlet which, in operation, is disposed substantially below the level of the fluid in which the container is floating.

BRIEF DESCRIPTION OF THE DRAWINGS

The invention is illustrated, merely by way of example, in the accompanying drawings, in which.

DESCRIPTION OF PREFERRED EMBODIMENTS

Terms such as "left" and "right", as used in the description below, are to be understood to refer to directions as seen in the accompanying drawings.

Most dirty fluids are non-Newtonian, i.e. their shear stress/shear rate characteristic is non-linear. Non-Newtonian fluids fall into three main classes, namely psuedo-plastic fluids, dilatant fluids, and Bingham plastic fluids.

Figure 1:
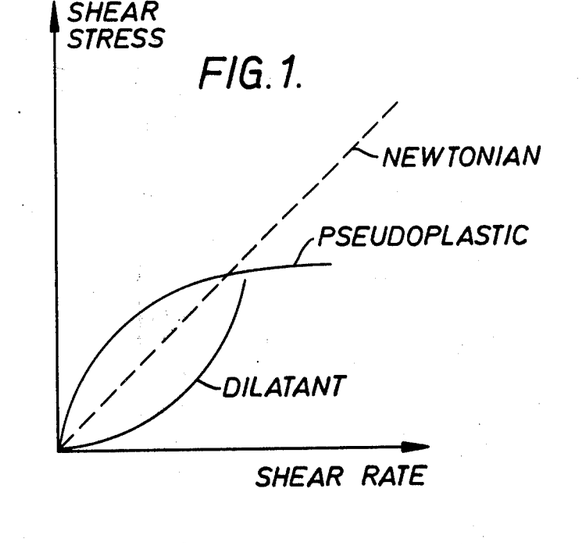
FIG. 1 is a graph showing the shear stress/shear rate characteristics of pseudoplastic fluids and dilatant fluids, in relation to a Newtonian fluid.
Figure 2:
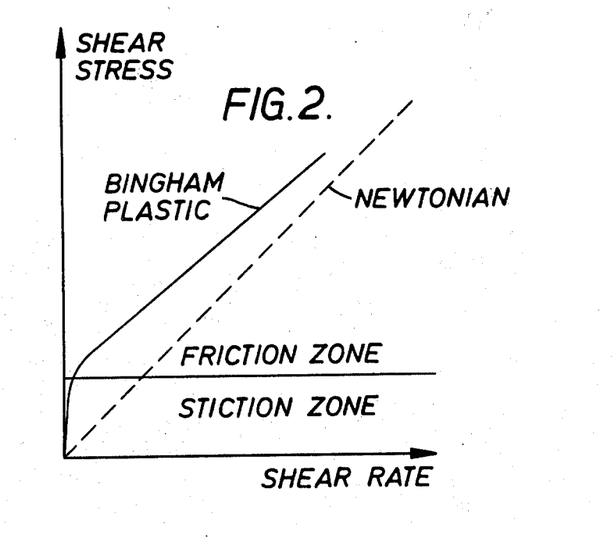
FIG. 2 is a graph similar to that of FIG. 1, but showing the characteristic of a Bingham plastic fluid in relation to a Newtonian fluid.

Examples of pseudoplastic fluids are polymeric solutions or melts, suspensions of paper pulp or pigments. Examples of dilatant fluids are water/starch mixtures, or suspensions in water of mica and/or quick sand and/or beach sand. Examples of Bingham plastic fluids are water suspensions of rocks or of agricultural grains, e.g. rice, sewage sludge, and oil slicks. As will be seen from FIGS. 1 and 2, pseudoplastic fluids have a convex shear stress/shear rate characteristic, dilatant fluids have a concave shear stress/shear rate characteristic, and Bingham plastic fluids have a shear stress/shear rate characteristic which is asymptotic to the shear stress ordinate in a stiction zone and is substantially linear in a friction zone. As will be seen from FIG. 2, a finite shear stress is required to overcome the initial stiction to initiate flow.

Considering first the case of the pseudoplastic fluids, by reason of the respective shapes of the shear stress/shear rate characteristic of the latter and that of a Newtonian fluid, if a paddle is moved slowly in a forward direction in a non-Newtonian fluid constituted by dirty water, and is retracted quickly backwards, a net positive force will be exerted on the fluid. Since the water in the said fluid is itself a Newtonian fluid, zero force will be applied to the water, while the dirt will be repelled away from the paddle. By changing the phase of the driving force on the paddle, the reverse will happen, i.e, when the paddle is moved forward fast and is retracted slowly, the dirt will move towards the paddle, while the water will be repelled. Thus this method of separating the dirt utilises the non-linearity of the shear stress/shear rate property of the dirt in the fluid so as to cause the dirt to move frictionally through the water in the fluid and thus to separate it from the water.

Figure 3:
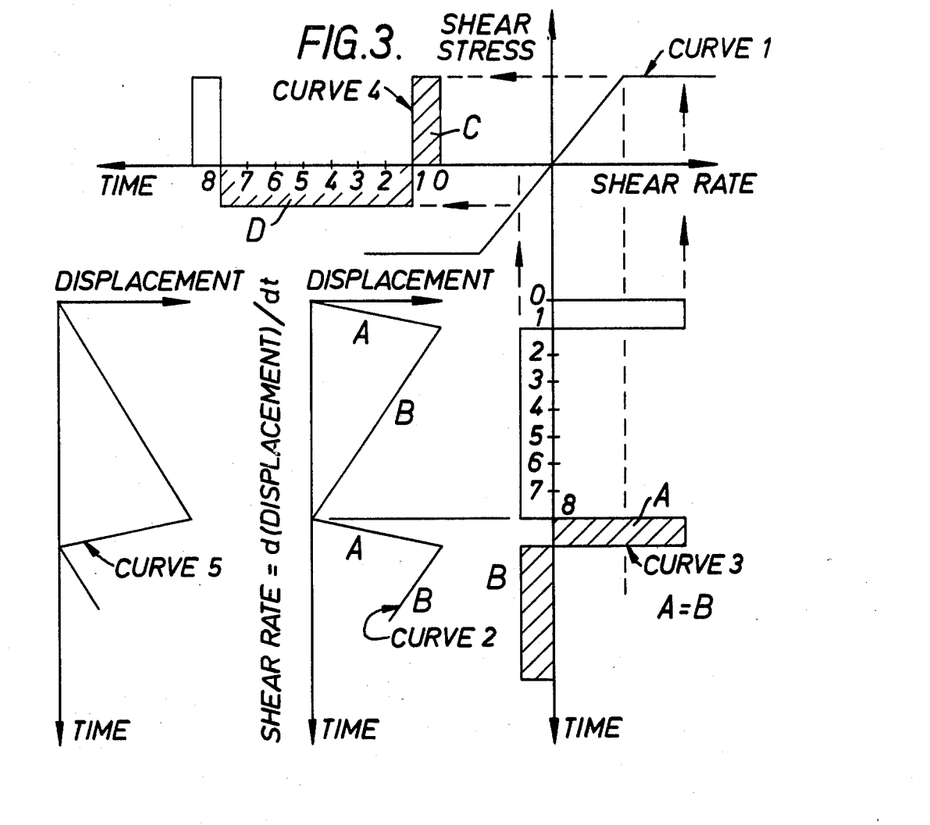
FIG. 3 shows graphs illustrating the shear stress/shear rate characteristics and the displacement/time characteristics of pseudoplastic fluids.

This is illustrated in FIG. 3 in which Curve 1 illustrates the Shear Stress/Shear Rate relationship of a wood pulp-water mixture. As will be seen, this relationship is linear only at low values of the Shear Rate.

Curve 2 illustrates the wave form of a reciprocable member, e.g. a diaphragm, which is driven fast forwardly, as indicated at A, and is driven slowly rearwardly, as indicated at B.

Curve 3 shows the time derivative of Curve 2 and, as will be seen therefrom, the area (the time integral) in the positive direction (area A) is exactly equal to the area in the negative direction (area B), i.e. the net movement of the reciprocable member is zero. If, therefore, the reciprocable member is driven as shown in Curves 2 and 3 while immersed in the wood pulp-water mixture to which Curve 1 relates, then the resulting shear stress in the wood pulp is shown in Curve 4. As will be seen from Curve 4, the time integral of the stress in the negative direction (area D) is much greater than that in the positive direction (area C). This will have the effect of moving the wood pulp towards the reciprocable member.

In order, therefore, to move the wood pulp away from the reciprocable member, the phase of the driving force imparted to the reciprocable member must be reversed as shown in Curve 5.

Figure 4:
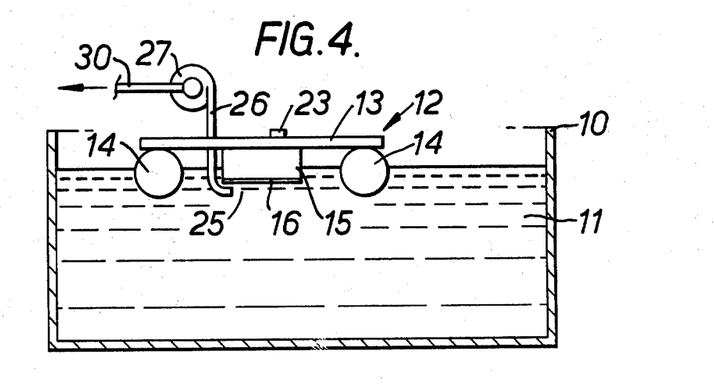
FIG. 4 is a diagrammatic cross-sectional view of a first embodiment of an apparatus according to the present invention.
Figure 5:
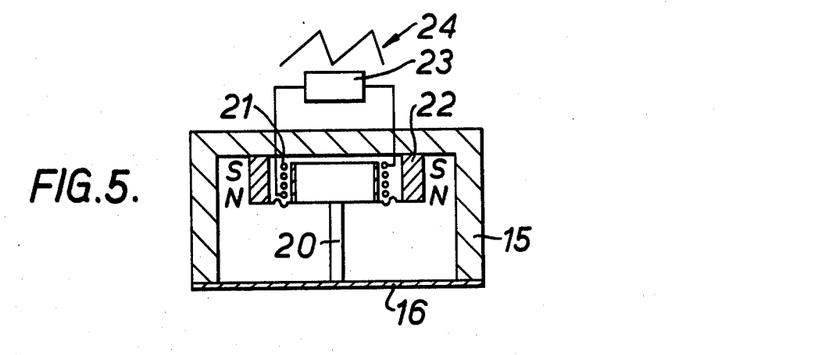
FIG. 5 is a diagrammatic cross-sectional view of one embodiment of part of the apparatus shown in FIG. 4.

In FIGS. 4 and 5 there is shown a first embodiment of an apparatus according to the present invention for separating the components of a pseudoplastic non-Newtonian fluid, e.g. for separating the wood pulp from a wood pulp-water mixture.

As shown in FIG. 4, a tank 10 contains a wood pulp-water mixture 11. Mounted in the mixture 11 is a float 12 comprising a platform 13 which is supported on float members 14. Supported by the platform 13 is a casing 15 provided with a diaphragm 16, the diaphragm 16 being immersed in the mixture 11.

The diaphragm 16 is connected by a connecting rod 20 (FIG. 5) to a moving coil 21 which is disposed within a permanent magnet 22, the arrangement of the moving coil 21 and permanent magnet 22 being similar to that in a loud speaker. In the case of the FIG. 5 embodiment, however, the moving coil 21 is connected to a Miller integrator 23 which is driven, as known per se, by an asymmetrical square wave drive and which generates a saw-tooth wave form 24.

The diaphragm 16 is thus in operation asymmetrically oscillated by virtue of being reciprocated relatively slowly in the downward direction and relatively fast in the upward direction. This has the effect of creating a layer 25 of relatively "clean" water adjacent to the diaphragm 16 and of increasing the "dirt" content of the mixture 11 beneath the layer 25. One end of a hose 26 is disposed in the layer 25 and thus adjacent to the diaphragm 16. The hose 26 is connected to a pump 27 which is arranged to pump the relatively "clean" water through a pipe 30 to a clean water tank, not shown, by way if desired of a filter such, for example, as a sand filter. If desired, the platform 13, instead of forming part of the float 12, may be permanently fixed to the bottom of the tank 10. As will be appreciated, the passage constituted by the hose 26 does not vary as a result of the said asymmetrical oscillation. That is to say, the said passage does not expand or contract in any way nor does it have a check valve therein which is operated by the said oscillation.

It will also be appreciated that the components of the fluid are separated in the construction shown in FIGS. 4 and 5 without altering or controlling the chemical composition or the physical characteristics of the fluid prior to separation.

If the phase of the driving force on the diaphragm 16 were reversed, the "dirt" would be moved towards the diaphragm 16 and could be sucked away from the latter.

Figure 6:
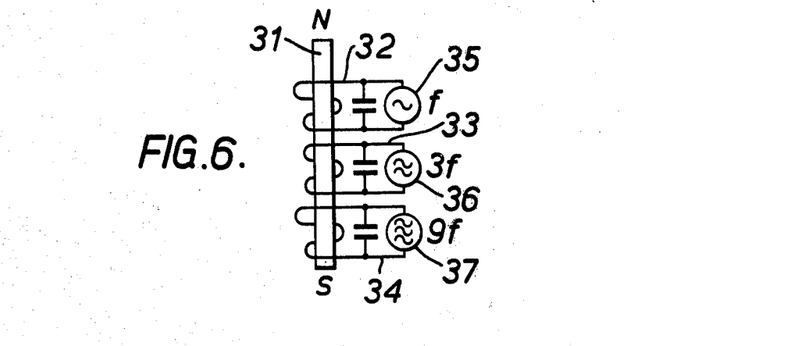
FIG. 6 is a diagrammatic view of another embodiment of the said part.
Figure 7:
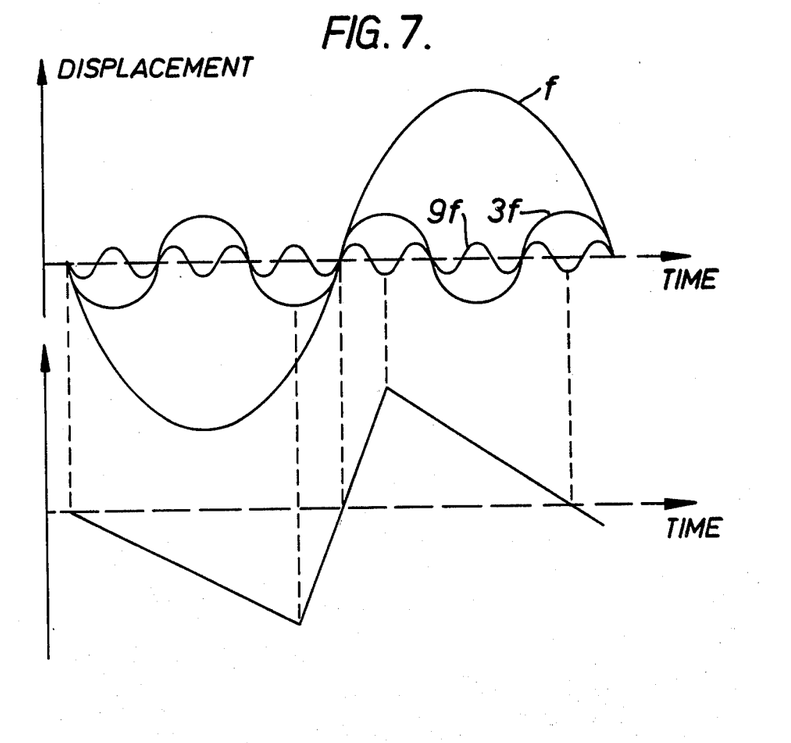
FIG. 7 is a graph illustrating the operation of the embodiment of FIG. 6.

The diaphragm 16, instead of being driven as shown in FIG. 5, could, as shown in FIG. 6, be driven by a connecting rod 31. The latter is constituted by a permanently magnetised member about which are wound coils 32, 33, 34 of sinusoidal generators or oscillators 35, 36, 37 respectively which have frequencies of f, 3f, 9f respectively. As illustrated in FIG. 7, the generators or oscillators 35–37 collectively produce the required saw-tooth drive in a manner much more efficient in terms of energy conversion than that involving the Miller generator.

The frequency and the amplitude relationship between the generators or oscillators 35–37 must conform in some way to the Fourier Series of a saw-tooth wave form. The highest frequency (for example 9f) can be generated if desired by one single generator or oscillator, which frequency can then be divided by three, twice, by means of binary dividers.

Figure 8:
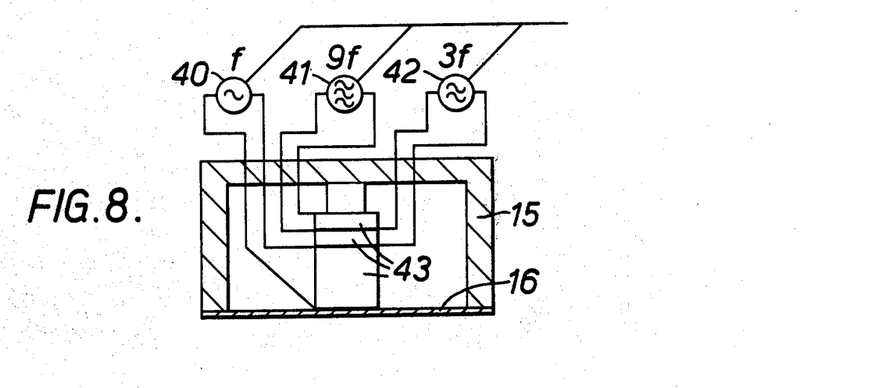
FIG. 8 is a diagrammatic cross-sectional view of yet another embodiment of the said part.

In FIG. 8 there is shown yet another way of driving the diaphragm 16. In the FIG. 8 construction, piezoelectric oscillators 40, 41, 42, having frequencies of f, 9f, 3f respectively, are employed to drive a connecting rod 43 which is connected to the diaphragm 16 and which is constituted by a stack of piezo-electric rings or rods. Use may also be made of switching devices such as Tristor (Trade Mark) and SCR switching devices, or of hydraulic or pneumatic drives to the diaphragm 16.

The reciprocable member, instead of being a diaphragm, could be constituted by a reciprocable plate, or by a reciprocable piston.

In some cases, the solid particles in an aqueous mixture may exhibit only a weak non-Newtonian property. This property, however, can be enhanced by adding a fluid or other chemical additive which will stick to the particles. If desired, the additive may be such that it will not dissolve in the water in the mixture, although this is not essential.

As explained above, water and oil mixtures constitute Bingham plastic fluids which exhibit non-Newtonian properties and can be separated by the method and apparatus of the present invention. In the case of an oil slick, the reciprocable member may be reciprocated by a force acting as shown in Curve 2, in which case the pump 27 will suck the separated oil to an oil tank (not shown), thus cleaning the sea and saving the oil. In this case, utilisation is still made of the shear stress/shear rate property of at least one component of the Bingham plastic fluid to separate the latter from the remaining component or components, but in this case use is made of the stiction (surface tension) between the components. Thus the reciprocation of the reciprocable member will subject the fluid to a shear stress above the yield point of the said at least one component so as to effect movement of the latter, and this movement may thereafter be slowed down to a speed at which it is separated from the remaining component or components.

In the case where the reciprocable member can exert a relatively high force on the fluid, but cannot vibrate fast enough to get the fluid over the Newtonian bond, the velocity of the fluid can be increased by driving the reciprocable member in a large chamber and forcing the fluid through a small orifice or venturi.

Figure 9:
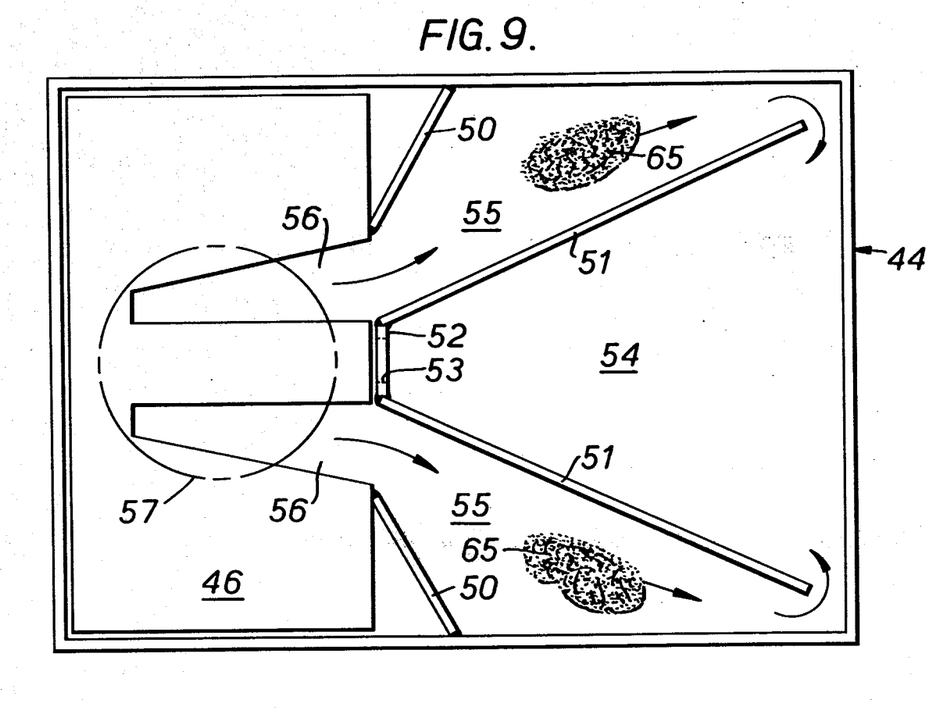
FIG. 9 is a sectional plan view of a second embodiment of an apparatus according to the present invention, FIG. 9 being taken on the line IX—IX of FIG. 10.
Figure 10:
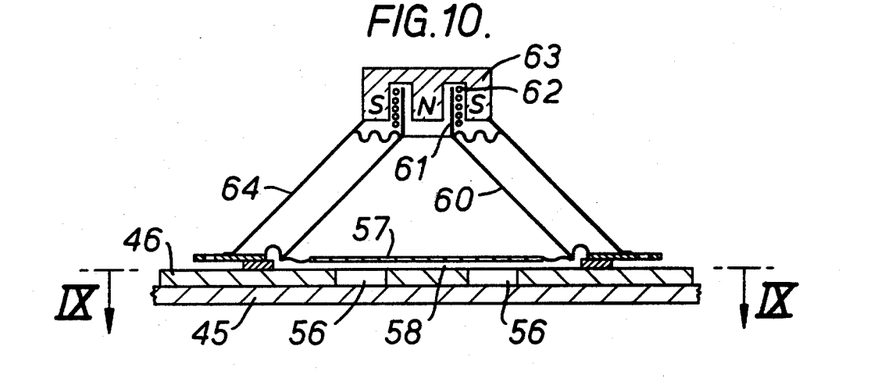
FIG. 10 is a broken-away sectional elevation of the said second embodiment.
Figure 11:
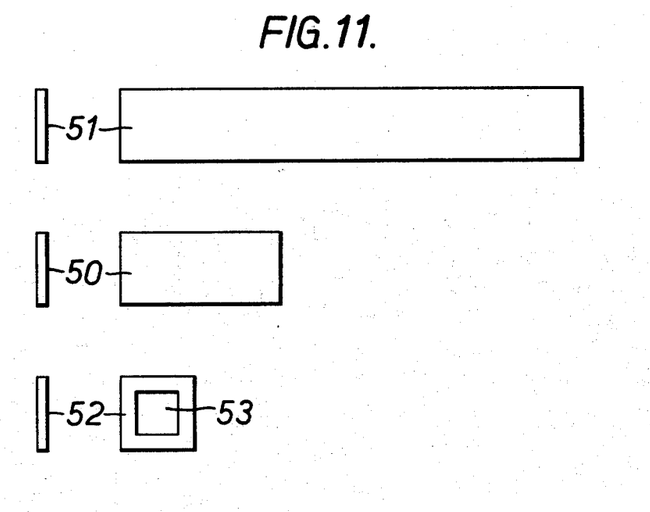
FIG. 11 shows elevations and end views of various components of the said second embodiment.

In FIGS. 9-11 there is shown a second embodiment of an apparatus according to the present invention, this embodiment being adapted for use on Bingham plastic fluids. As shown therein, the apparatus comprises a container 44 for containing an oil-water mixture whose components are to be separated.

The container 44 has a base wall 45 on which are mounted a slotted plate 46, two spaced apart baffles 50, two spaced apart baffles 51, and a wall member 52 having an aperture 53 (or, if desired, more than one aperture) therein. The baffles 51 have their left hand ends adjacent to the slotted plate 46 and are interconnected by the wall member 52. The baffles 51 and the wall member 52 define with the adjacent walls of the container 44 a central or collection space 54 into which the oil may be collected. Each baffle 51, together with its respective baffle 50 and the adjacent walls of the container 44, defines an outer space 55 which communicates with the central space 54 at the right hand ends of the baffles 51. Each of the outer spaces 55 communicates with a respective slot 56 which extends through the slotted plate 46.

Mounted above and closely adjacent to the slotted plate 46 is a diaphragm 57. The diaphragm 57 is carried by a part-conical member 60 (FIG. 10) which has a cylindrical portion 61 carrying a moving coil 62. The moving coil 62 is disposed between North and South poles of a permanent magnet 63 which is supported by a frusto-conical member 64 mounted on the slotted plate 46.

The diaphragm 57 is disposed adjacent to but is spaced by a small space 58 from the slotted plate 46 and partially overlies the slots 56 therein. Accordingly if the moving coil 62 is connected in the same manner as the moving coil 21 of FIG. 5, the saw-tooth wave form so generated can be arranged to produce fast downward movement and slow upward movement of the diaphragm 57.

In operation, the container 44 is filled with an oil-water mixture to a level at least up to that of the diaphragm 57. The shear-stress/shear-rate characteristic of oil/water mixtures is reversed from that shown in Curve 1 of FIG. 3. Consequently, when the diaphragm 57 moves slowly upwardly away from the slotted plate 46, the fluid is drawn into the space 58. When, however, diaphragm 57 moves fast downwardly towards the slotted plate 46, oil particles 65 will be repelled from the diaphragm 57 and will be expelled from the space 58 and moved through the passageways constituted by the slots 56 and the outer spaces 55 to the central space 54, there being no variation of these passageways as a result of the movement of the fluid imparted by the oscillation of the diaphragm 57. The said passageways are open at their tops and may also, if desired, (or may alternatively) be open at their bottoms. Consequently, the movement of the oil particles 65 through the said passageways and in the directions indicated by the arrows will tend to cause corresponding movement of the oil particles 65 in any of the oil/water mixture above or below the said passageways. Thus the provision of the said passageways will streamline the flow in the directions indicated by the arrows.

The provision of the aperture or apertures 53 reduces resistance to the flow of the oil particles 65 into the central space 54. The oil particles 65 which thus accumulate in the central space 54 can be sucked therefrom by a pump (not shown), or can be scraped therefrom. Thus, in operation the oil/water mixture will merely oscillate in the outer spaces 55 and in the central space 54, oil particles 65 travelling towards the central space 54 and "clean" water travelling towards the diaphragm 57, whereby the latter is prevented from being fouled by the oil.

It is of course, however, possible to cause the diaphragm 57 to be moved slowly downwards and rapidly upwards, in which case oil particles 65 would be driven towards the diaphragm 57 and "clean" water would be driven towards the central space 54.

The optimum frequency of oscillation of the diaphragm 57 is that which produces a wave which enhances the separation of the components of the fluid. For example the said frequency of oscillation may be such as to make the reflected wave from the walls of the container 44 enhance the movement of the diaphragm 57.

Figure 12:
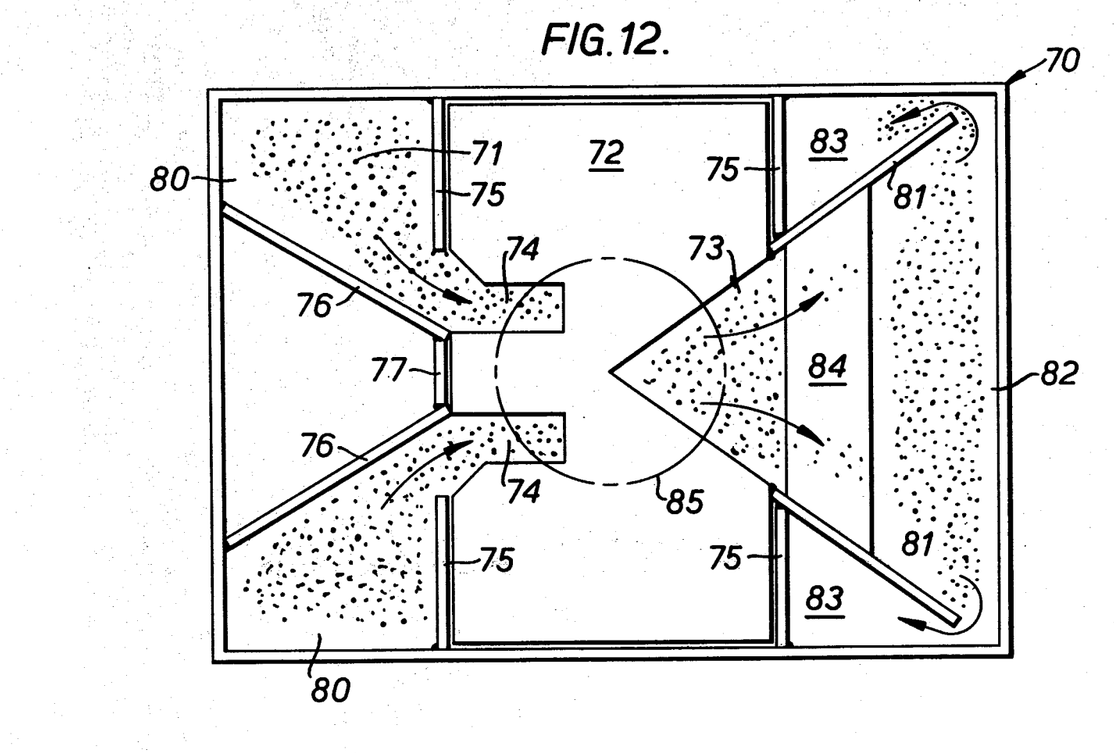
FIG. 12 is a sectional plan view of a third embodiment of an apparatus according to the present invention.
Figure 13:
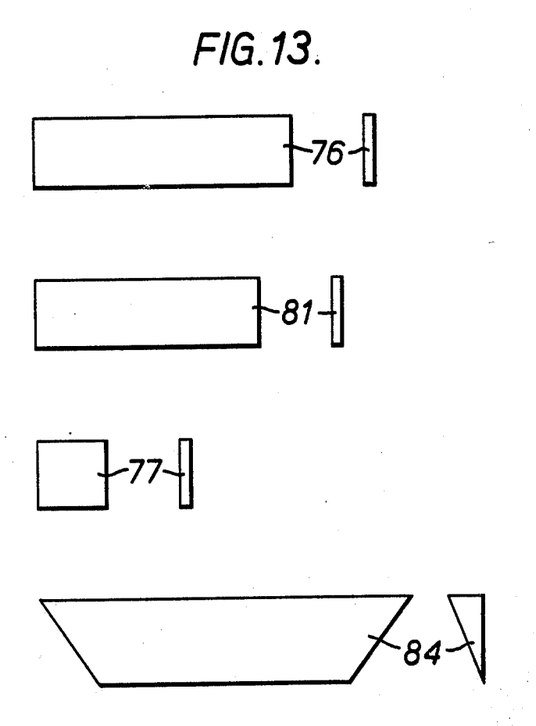
FIG. 13 shows elevations and end views of various components of the said third embodiment.

In FIGS. 12 and 13 there is shown a third embodiment of an apparatus according to the present invention, this embodiment being adapted for use on dilatant fluids and pseudoplastic fluids. As shown therein, the apparatus comprises a container 70 for containing water having suspended particles 71 therein.

The container 70 has a base wall (not shown) on which is mounted a slotted plate 72 which is disposed centrally of the container 70. The slotted plate 72 has a relatively large slot 73 on one side thereof whose volume is substantially larger than that of two spaced apart relatively small slots 74 which are disposed on the opposite side of the slotted plate 72.

Mounted on the base wall of the container 70 and on opposite sides of the slotted plate 72 are four weirs 75. Mounted on the said base wall on the left hand side of the slotted plate 72 are two spaced baffles 76 which are interconnected at their ends adjacent the slotted plate 72 by a baffle 77. The baffles 76 and respective weirs 75 define with the adjacent walls of the container 70 spaces 80 which respectively communicate with the slots 74.

Mounted on the base wall of the container 70 on the right hand side of the slotted plate 72 are two spaced apart baffles 81 which define therebetween a central space 82. Each baffle 81, together with its respective weir 75 and the adjacent walls of the container 70, defines an outer space 83 which communicates with the central space 82 at the right hand end of the respective baffle 81. The central space 82, which has a ramp 84 therein, communicates with the slot 73.

Mounted above and spaced from the slotted plate 72 is a diaphragm 85 which partially overlies the slots 73, 74. The diaphragm 85 corresponds to the diaphragm 57 and is moved by similar means (not shown). However, it is moved fast upwardly and slowly downwardly for the dilatant fluids, or slow upwardly and fast downwardly for the pseudoplastic fluids.

In operation, as applied to pseudoplastic fluids, the container 70 is filled with water containing suspended particles 71 to a level at least up to that of the diaphragm 85. In this case, the water with the suspended particles therein will behave as shown in Curve 1 of FIG. 3. Consequently, the slow upward movement of the diaphragm 85 will draw the particles 71 from the spaces 80 to the slits 74 and so towards the diaphragm 85, while the fast downward movement of the diaphragm 85 will cause "dirty" water containing the particles 71 to be moved away from the diaphragm 85. However, by reason of the relative size of the slots 73, 74, more "dirty" water will be forced away from the diaphragm 85 through the slot 73 than through the slots 74. A fast stream of "dirty" water will thus be pushed over the ramp 84 and into the central space 82, the ramp 84 reducing the velocity of the "dirty" water which has flowed thereover. The "dirty" water is thus pushed into the outer spaces 83 where the particles 71 will collect and can be scooped off. The water in the upper portions of the outer spaces 83 will flow over the respective weirs 75 and towards the space between the slotted plate 72 and the diaphragm 85, the weirs 75 reducing or preventing return flow of the particles 71 towards the diaphragm 85.

As in the case of the construction of FIGS. 9–11, the fluid flowing through the passageways constituted by the slots 73, 74, spaces 80, central space 82, and outer spaces 83, which passageways are open at their tops and may also, if desired, or may alternatively be open at their bottoms, tends to cause corresponding movement of the fluid above and below the passageways so as to streamline the flow in the directions indicated by the arrows. There is, of course, no variation of these passageways as a result of the movement of the fluid imparted by oscillation of the diaphragm 85. Moreover, the "clean" water moves in and out adjacent to the diaphragm 85, thus keeping it clean, while the particles 71 are moved from the spaces 80 to the outer spaces 83.

The optimum frequency of reciprocation of the diaphragm 85 is one which creates a standing wave in the spaces 80, such wave being reflected from the walls of the container 70 so as to enhance the reciprocation of the diaphragm 85.

Each of the constructions shown in FIGS. 9–11 and in FIGS. 12 and 13 may be used in the embodiment shown in FIG. 4, except that the slotted plates 46, 72 will be part of the float 12. Alternatively, the slotted plates and baffles may be omitted, and the required streamlining of the flow may be achieved by the use of a floating pontoon.

Where the diaphragms 16, 57, 85 are large, it may be preferable to drive them by a large piston driven by a cam. In the case of an oil spill at sea, a calm sea is not necessary for successful recovery of the oil, provided that the asymmetric waves generated by the piston are larger than the prevailing waves of the sea. In some cases, the natural waves will help to break up the oil slick into smaller "puddles" which are easier to move.

Figure 14:
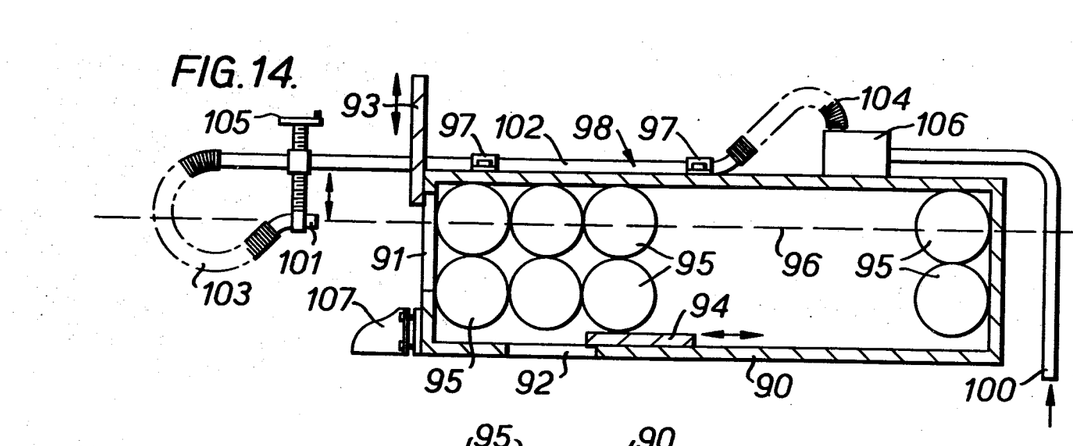
FIGS. 14 and 15 are respectively a sectional elevation and a plan of a fourth embodiment of an apparatus according to the present invention.
Figure 15:
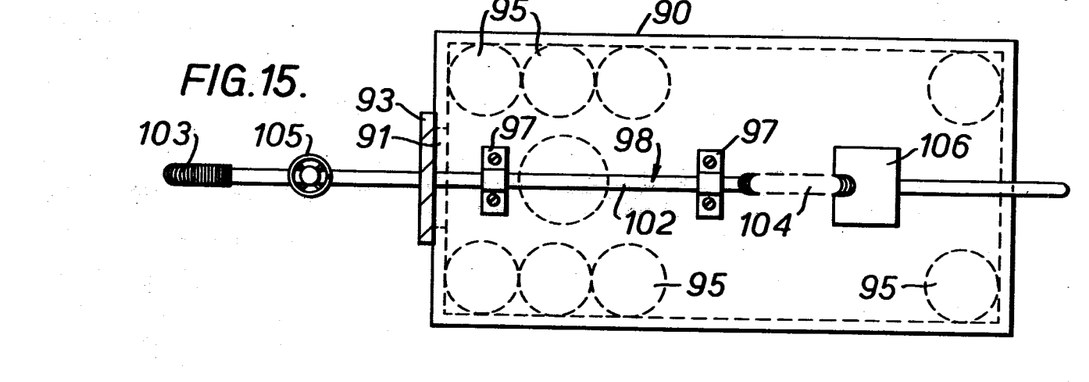

In FIGS. 14 and 15 there is shown a fourth embodiment of an apparatus according to the present invention, this embodiment being adapted for use on Bingham plastic fluids, e.g. a mixture of oil and water.

As shown in FIGS. 14 and 15, the apparatus comprises a container 90 which is adapted to float in the mixture of oil and water, e.g. to float at sea in an oil slick. The container 90 is a closed box-like container having an inlet aperture 91 and an adjacent outlet aperture 92. The container 90 is provided with gates 93, 94 which may be moved (by means not shown) so as to open and close the apertures 91, 92 respectively.

The container 90 contains a number of buoyancy spheres 95 each of which may be introduced into the container 90 through the inlet aperture 91. The number of buoyancy spheres 95 may be adjusted so as to vary the degree of buoyancy of the container 90 so that the latter floats in the sea in a predetermined position in relation to the water level 96. Alternatively, the buoyancy spheres 95 may be filled with or emptied of water or other liquid to adjust the position of the container 90 in the water.

Slidably mounted on the top of the container 90 and loosely held to the latter by straps 97 is a conduit 98 whose inlet 100 extends at least to the water level 96 and may, as shown, extend substantially below the container 90. The conduit 98 has a nozzle 101 which is connected to a main portion 102 of the conduit 98 by a flexible portion 103. The distance between the nozzle 101 and the inlet aperture 91 may be adjusted by sliding the main portion 102 of the conduit 98 over the top of the container 90, such sliding motion being possible by reason of the provision of a flexible portion 104 of the conduit 98. The nozzle 101 may be raised and lowered and tilted with respect to the inlet aperture 91 and thus with respect to the water level 96 by means of a screw and nut device 105, such raising, lowering and tilting of the nozzle 101 being permitted by the provision of the flexible portion 103.

A pump 106 is connected in the conduit 98 so as to cause the "clean" sea water to be sucked out of the inlet 100 and to issue from the nozzle 101 in the form of a continuous jet which is directed into the inlet aperture 91.

The cross-sectional area of the outlet aperture 92 is greater than, and may for instance be seven times that, of the nozzle 101. Similarly, the cross-sectional area of the inlet aperture 91 is greater than, and may for instance be ten times that, of the nozzle 101.

In operation, the "clean" sea water is sucked out of the inlet 100 and is directed from the nozzle 101 as a jet. The nozzle 101 is adjusted to be a convenient distance, e.g. twelve times the diameter of the nozzle 101, from the inlet aperture 91. The nozzle 101 is also preferably adjusted by the screw and nut device 105 so that the axis of the nozzle 101 lies in the plane of the water level 96 and the jet produced by the nozzle 101 is directed along the surface of the water.

It is possible, if desired, for the nozzle 101 to be arranged well above the water level 96 and for it to be tilted so that the jet from the nozzle 101 hits the water level 96 just before the inlet aperture 91. This is not the preferred method of operation, however, as it causes splashes and does not skim the very thin sheens encountered in some oil slicks.

The pump 106 is adjustable so that the velocity of the jet from the nozzle 101 may be set at a desired value. If the said velocity is too low, the jet will fail to "tear" the oil away from the water and push the oil into the container 90. On the other hand, if the said velocity is too high, the jet will cause eddies, which will prevent fresh oil from replacing the oil which has been pushed by the jet into the container 90. The ideal jet velocity is thus just below that which would cause turbulence in the "dirty" sea water.

The jet diverges from the nozzle 101 but it is important to arrange that the cross-section of the jet immediately upstream of the inlet aperture 91 is substantially the same as the cross-section of the inlet aperture 91. This is because if the cross-section of the jet immediately upstream of the inlet aperture 91 is greater than the cross-section of the latter, the jet will be split and thus will produce circulating currents which will prevent fresh oil from being sucked into the container 90. On the other hand, if the cross-section of the jet immediately upstream of the inlet aperture 91 is less than the cross-section of the latter, then oil in the container 90 will be able to spill back into the sea.

The jet of "dirty" sea water entering the container 90 is slowed down in the latter. This slowing down of the oil in the "dirty" sea water will cause the oil to remain in the container 90, while the "clean" sea water passes out through the passage constituted by the outlet aperture 92, there being, of course, no variation in this passage as a result of the movement of the "dirty" sea water into the container 90. Thus the construction of FIGS. 14 and 15 utilises the non-linearity of the shear stress/shear rate property of the oil so as to separate it from the sea water, the construction permitting skimming of very fine sheens of oil down to the thickness of the wavelength of light. Once the container 90 has been filled with oil, the gates 93, 94 are closed, and the container 90 is removed from the sea for subsequent emptying. Alternatively, the oil may be pumped out of the container 90 (by means not shown).

The jet produced by the nozzle 101 can be used to propel the container 90 over the surface of the sea which has been polluted by the oil slick. For this purpose, a rudder 107 is provided on the container 90, and an auxiliary motor (not shown) can also be provided on the container 90 to assist navigation of the latter.

If the inlet 100 is disposed adjacent to the water level 96, the suction will be at its maximum. However, if the inlet 100 is disposed well below the water surface, the pump 106 will be kept free of debris and oil.

The outlet aperture 92 is larger than the nozzle 101 in order to reduce the velocity of flow within the container 90, since reliance is being placed on stiction and on the difference in the specific gravity between the water and the oil to keep the oil inside the container 90.

The container 90 can be absolutely completely filled with oil provided that the jet entering the inlet aperture 91 creates sufficient head to overcome the differential pressure created by the displaced oil. As oil is lighter than water, it will displace a higher mass of water per unit volume.

The container 90 may be constituted by a box built inside a vessel such as a catamaran. Moreover, it is not essential for the container to be box-like at all since it could be constituted by a barge, the latter having, for example, an outlet at its side for the "clean" water. Indeed, for on-shore applications, the container can be constituted by a pond separated from a pond containing the water-oil mixture by means of a weir, the first-mentioned pond having an outlet passage through which the "clean" water may be pumped. Moreover, if desired, a ramp may lead to the weir—as in the construction shown in FIG. 12.

Instead of the oil being pushed into the container 90 by means of a jet, it can in some cases be sucked in with a suction pump. However, in the case of thin sheens, it is very difficult merely to suck in the oil since the oil, water and air which are sucked into the container 90 become thoroughly mixed together and emerge as a homogeneous mixture.

I claim:

1. Apparatus for separating the components of a non-Newtonian fluid comprising a reciprocable member adapted to be in contact with the fluid; a slotted member having at least one slot therein, the slotted member being disposed adjacent to but spaced from the reciprocable member to cause reciprocation of the reciprocable member away from the slotted member to draw the fluid into the space between said reciprocable member and said slotted member and reciprocation of the reciprocable member towards the slotted member to expel the fluid from said space; means for reciprocating the reciprocable member relatively fast in one direction of reciprocation and relatively slowly in the opposite direction thereof; and means defining at least one collection space which communicates with said at least one slot, reciprocation of the reciprocable member moving one of the components of the fluid to said at least one collection space.

2. Apparatus as claimed in claim 1 in which the means for reciprocating the reciprocable member comprises a moving coil disposed within a magnet.

3. Apparatus as claimed in claim 1 in which the means for reciprocating the reciprocable member comprises a plurality of sinusoidal generators of different frequencies.

4. Apparatus as claimed in claim 1 in which the means for reciprocating the reciprocable member comprises a plurality of piezo-electric oscillators of different frequencies.

5. Apparatus as claimed in claim 1 in which the reciprocable member is a diaphragm.

6. Apparatus as claimed in claim 1 in which the apparatus comprises a float which carries the reciprocable member.

7. Apparatus as claimed in claim 1 in which said means for reciprocating reciprocates said reciprocable member with a frequency that produces a wave which enhances the reciprocation.

8. Apparatus as claimed in claim 1 further comprising a weir within said collection space to reduce return flow of a component towards said reciprocable member.

9. Apparatus as claimed in claim 1 in which the slotted member is provided with at least one first slot and at least one second slot, said apparatus further comprising means defining a reception space for containing the fluid; said at least one first slot communicating with said collection space and said at least one second slot communicating with said reception space, reciprocation of the reciprocable member moving a component of the fluid from said reception space to said collection space.

10. Apparatus as claimed in claim 9 in which the first and second slots are respectively large and relatively small slots.

* * * * *